Dec. 6, 1938.   W. R. KALES ET AL   2,139,547
RUNNING GEAR
Filed April 12, 1937   2 Sheets-Sheet 1
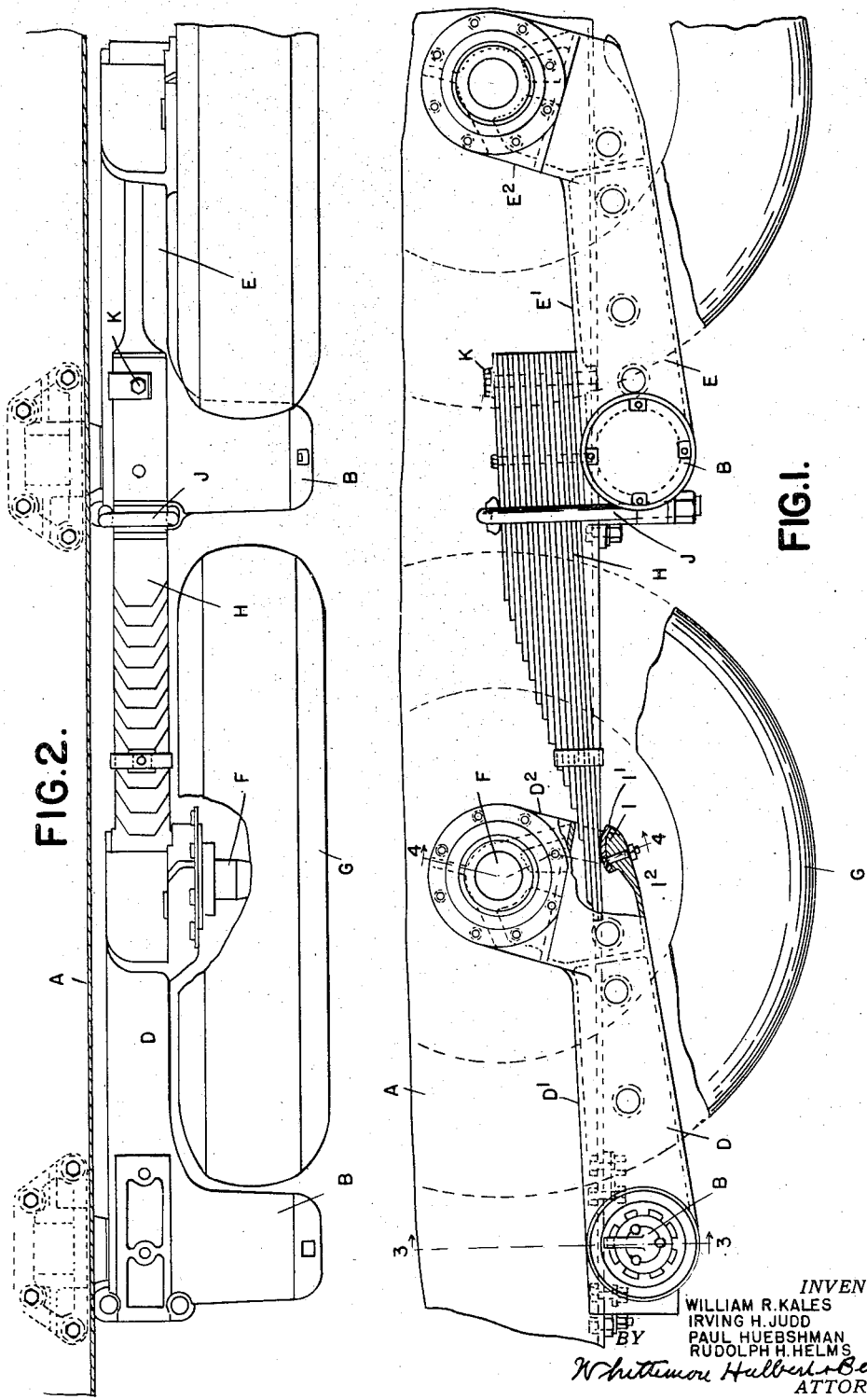
INVENTORS
WILLIAM R. KALES
IRVING H. JUDD
PAUL HUEBSHMAN
RUDOLPH H. HELMS
ATTORNEYS Dec. 6, 1938.     W. R. KALES ET AL     2,139,547
RUNNING GEAR
Filed April 12, 1937     2 Sheets—Sheet 2

INVENTORS
WILLIAM R. KALES
IRVING H. JUDD
BY   PAUL HUEBSHMAN
RUDOLPH H. HELMS
Whittemore Hulbert & Belknap
ATTORNEYS Patented Dec. 6, 1938

2,139,547

UNITED STATES PATENT OFFICE 2,139,547

RUNNING GEAR

William R. Kales, Detroit, Irving H. Judd, Dearborn, and Paul Huebshman and Rudolph H. Helms, Melvindale, Mich., assignors to Whitehead & Kales Company, River Rouge, Mich., a corporation of Michigan Application April 12, 1937, Serial No. 136,472

11 Claims. (Cl. 280—104)

The invention relates to running gears and more particularly to that type comprising tandem wheels and a walking beam or equivalent means for connecting the same to the vehicle frame, and through which the load is uniformly distributed thereon. Such constructions have the advantage of not only equalizing the load upon the wheels, but also of reducing the vertical deflection due to the passing of one or the other of said wheels over an obstruction in the roadway. However, where brakes are applied to the wheels it has been found that the wear of the tire on one of the tandem wheels is much greater than that on the other. This is due to the fact that when the brakes are applied the braking torque is transmitted through the walking beam and has the effect of lifting the rear wheel and pressing downward the forward wheel. In other words, it destroys the equal distribution of load on the two wheels and places a greater amount on the forward wheel with the consequent increased wear of the tire. It is the object of the present invention to avoid this defect, and to this end the invention consists in the novel construction of means for absorbing stresses due to braking torque, whereby such stresses are prevented from reacting differently upon the tandem wheels. The invention further consists in the novel construction and combination of parts as hereinafter set forth.

In the drawings:

Figure 1 is a side elevation of a portion of a vehicle to which our improved tandem drive is applied;

Figure 2 is a plan view thereof;

Figure 4:
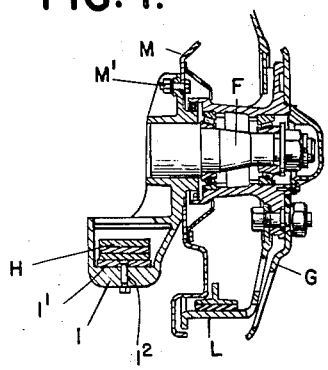
Figure 4 is a vertical cross section on line 4—4 of Figure 1.
Figure 3:
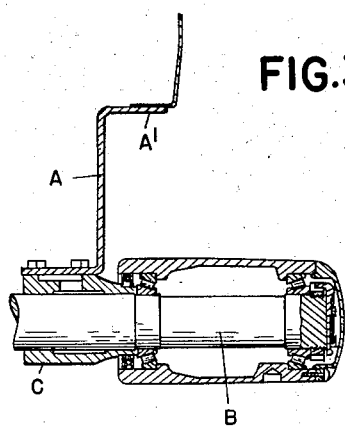
Figure 3 is a vertical cross section on line 3—3 of Figure 1.
Figure 5:
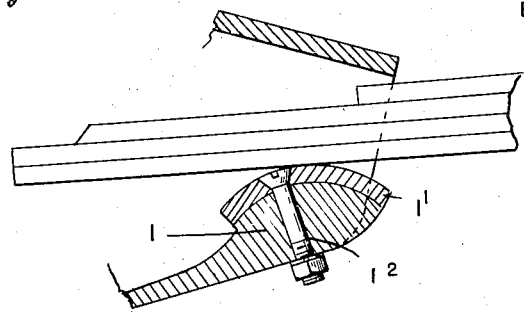
Figure 5 is an enlarged longitudinal section on line 5—5 of Figure 4.

Our improved running gear is particularly adapted for use on vehicles designed to carry heavy loads, such for instance as motor vehicle transports. These are usually trailers in which the greater part of the load is carried upon the tandem wheels arranged upon opposite sides and near the rear end. The trailer is usually drawn by a truck which controls its movement as well as sustaining a portion of the load. It has, however, been found desirable for better control to provide the tandem wheels with brakes. The brakes are anchored to the walking beam and inasmuch as the axle for one of the wheels is at the forward end of this walking beam and that for the other wheel is at the rear end thereof, the unequal reaction upon the wheels is produced as above described.

Our improvement consists essentially in providing separate brake anchorages for the two tandem wheels and so designing these anchorages as to produce equal reactions on the wheels and in the same direction. As specifically shown, this is accomplished by mounting each wheel on a rock arm, said rock arms extending in the same direction from their respective wheels to the point of attachment on the vehicle frame. The brakes are anchored to these rock arms and the braking torque reaction will, therefore, be the same on each of the wheels. However, in order to equally distribute the load to the two wheels, there is also a walking beam connection between the same. This walking beam is formed by an oppositely extending arm rigidly connected to one of said rock arms and bearing upon the free end of the other rock arm.

In detail, A represents the sill of the vehicle which as shown is in the form of a Z-bar. B are dead axles extending across the vehicle frame beneath said sills and connected to the latter through bearings C. These dead axles have pivotally mounted thereon the rock arms D and E respectively which extend rearwardly therefrom and at their free ends are provided with stub axles F. G are wheels of any suitable construction mounted on these stub axles. To support the load upon the wheels the rear rock arm E is provided with a forwardly projecting arm H which rests upon a bearing I at the free end of the rock arm D. This arm H is preferably a leaf spring which, therefore, performs the function of a spring suspension, in addition to its function of distributing the load between the two wheels. The leaves of the spring are rigidly secured to the rock arm E by the U-clip J and bolt K, and the leaves at the free end are slidably supported on the bearing I. This bearing is of arcuate form so as to maintain the spring in tangent relation thereto in all positions of angular adjustment of the rock arms D and E. To provide clearance for the oscillation of the rock arms D and E they are preferably provided with portions D' and E' extending substantially horizontally from the dead axles B and also having outwardly offset upwardly extending portions $D^2$ and $E^2$ to which the stub axles F are secured. The portions D' and E' extend beneath the outwardly extending flange A' of the sills, but there is sufficient clearance therebeneath for the maximum oscillation. The portions $D^2$ and $E^2$ clear this flange and, therefore, can swing upward above the same. This arrangement of parts has the advantage that the dead axles B can be arranged considerably below the normal height of the stub axles F, which permits of designing the vehicle body with a flat floor extending over the dead axles. On the other hand, the wheels, together with the stub axles and upwardly extending portions $D^2$ and $E^2$ of the rock arms, being arranged outside of the sills, will not interfere materially with the internal capacity of the vehicle body.

A brake drum L is mounted upon each wheel G and the brake head M is secured by bolts M' to the portions $D^2$ and $E^2$ of the rock arms D and E. These heads form the anchorage for the brake friction means (not shown) and will thus transmit the torque reaction therefrom into the arms D and E. As both of these arms extend in the same direction from their pivotal connections with the frame the reactions will be the same in the two wheels.

As the bearing I is in frictional engagement with the spring arm H, we preferably provide it with a hardened facing I' which is secured by the bolt $I^2$.

Figure 6:
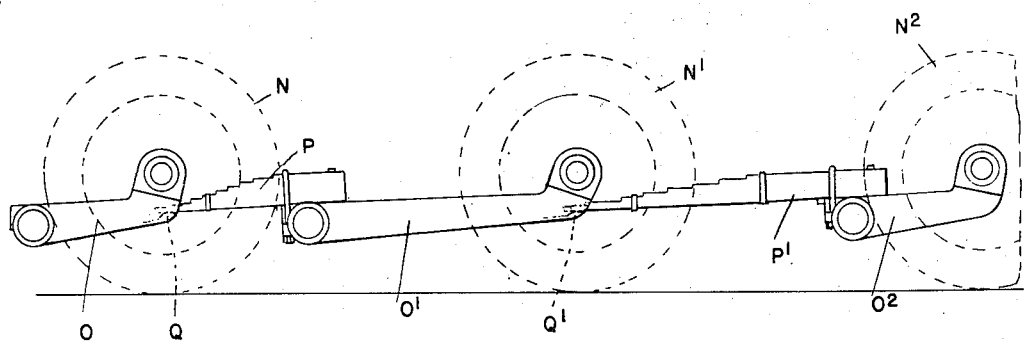
Figure 6 is a diagrammatic side elevation illustrating a modified construction.

For carrying exceptionally heavy loads it may be desirable to have more than two wheels in tandem and to uniformly distribute the load therebetween. This is illustrated in Figure 6 in which N, N', $N^2$ are three wheels arranged in tandem and connected respectively to the rock arms O, O' and $O^2$, each pivotally connected to the frame and all extending in the same direction therefrom. The rock arms O' and $O^2$ are provided with spring arms P and P' extending oppositely therefrom and into load sustaining engagement with the rock arm for the adjacent wheel, as indicated at Q and Q'. It will be noted that the central wheel N' sustains the load transmitted thereto through both the rock arm O' and the spring arm P', whereas the end wheels N and $N^2$ sustain only the load transmitted respectively through the spring arm P and the rock arm $O^2$. Therefore to obtain equal distribution of load on each of the wheels the rock arm O' and spring arm P' are each twice the length of the spring arm P and rock arm $O^2$.

An important advantage of this construction and also of the construction previously described is that the wheels always remain in the same vertical plane with respect to the side of the vehicle frame and body. Thus, while the wheels are free to independently rise and fall, they always remain parallel to the side of the vehicle which permits of cutting down clearance to the minimum. Another advantage is that each of the rock arms forms a radius rod for connecting its wheel to the body and for defining the path of movement of the wheel.

Due to the construction set forth, the unsprung weight of our running gear is considerably reduced over other tandem running gear constructions. As a result, the life of the tires is longer and the vehicle rides smoother. Moreover, our construction allows for a lower floor loading to ground height than is possible with other tandem axles. Such construction also allows for a simpler trailer frame structure throughout the lower deck, especially where the axles are attached to the frame, eliminating any longitudinal offset frame construction on the lower deck, such, for example, as shown in Francis 2,119,671.

What we claim as our invention is:

1. In a vehicle running gear, the combination with a frame and tandem wheels for supporting the same, of rock arms on said frame extending therefrom in the same direction and respectively connected to said wheels, a leaf spring rigidly secured to one of said rock arms and extending oppositely therefrom and having a load sustaining connection with the other rock arm, and brake mechanism for said wheels carried in part by said rock arms.

2. In a vehicle running gear, the combination with a frame and tandem wheels for supporting the same, of independently movable rock arms on said frame extending therefrom in the same direction and respectively connected to said wheels, a leaf spring rigidly secured to one of said rock arms and extending oppositely therefrom into sliding engagement with the other rock arm, a segmental bearing on the latter rock arm for maintaining said sliding engagement in all positions of angular adjustment of said rock arms, and brake mechanism for said wheels carried in part by said rock arms.

3. In a vehicle running gear, the combination with a frame including a side sill having an outwardly extending top flange and tandem wheels for supporting said frame, of axles extending beneath said side sill, rock arms pivotally secured to said axles and extending therefrom in the same direction beneath the outwardly extending flange, the free end portions of said rock arms extending upwardly and being laterally offset to clear said sill, stub axles mounted in said upwardly extending portions and forming journals for said wheels, and a leaf spring rigidly secured to one of said rock arms and having a load sustaining connection with the free end of the other rock arm, said springs being also located beneath said flange.

4. In a vehicle running gear, the combination with a frame and tandem wheels for supporting the same, of rock arms for said wheels pivotally connected to said frame, said rock arms extending in the same direction from their respective wheels to the point of attachment to the frame and being movable independently of each other about their respective pivotal connections, separate brakes for said wheels anchored to the respective rock arms, and an oppositely extending spring arm fixed at one end to one of the rock arms aforesaid adjacent its point of attachment to the frame and having a load sustaining connection with the free end of the adjacent rock arm.

5. In a vehicle running gear, the combination with a frame, of substantially parallel dead axles extending across said frame, independent rock arms pivoted at their forward ends upon the axles and provided at their rear ends with stub axles, ground wheels on said stub axles, a leaf spring fixed at one end to one of said rock arms adjacent its pivotal connection with its dead axle and having a load sustaining connection with the other rock arm at its free end, brake drums mounted upon each wheel, and brake heads fixed to the respective rock arms and adapted to carry means for frictionally engaging the brake drums.

6. In a vehicle running gear, the combination with a frame and tandem wheels for supporting the same, of rock arms for said wheels pivotally connected at one end thereof to said frame, said rock arms being provided at their free ends with stub axles for said wheels and being movable independently of each other about their respective pivotal connections, separate brakes for said wheels anchored to the respective rock arms, and a leaf spring fixed at one end to one of the rock arms adjacent its point of attachment to the frame and having a load sustaining connection with the free end of the adjacent rock arm.

7. In a vehicle running gear, the combination with a frame and tandem wheels for supporting the same, of independent rock arms pivoted at their forward ends to said frame and provided at their rear ends with stub axles, ground wheels on said stub axles, a leaf spring fixed at one end to one of said rock arms at its forward end and having a load sustaining connection with the other rock arm at its rear end, brake drums mounted upon each wheel, and brake heads fixed to the respective rock arms and adapted to carry means for frictionally engaging the brake drums.

8. In a vehicle running gear, the combination with a frame, and tandem wheels for supporting the same, of independent rock arms pivoted at one end to said frame and having stub axles for said wheels, means for proportionately distributing the load on said wheels including a leaf spring fixed to one of said arms adjacent its pivotal connection with the frame and having a load sustaining connection with the other arm adjacent its stub axle, and brake mechanism for said wheels carried in part by said arms whereby the braking torque reaction will be absorbed without materially altering the distribution of the load on said wheels.

9. In a vehicle running gear, the combination with a frame including a side sill, and tandem wheels for supporting said frame, of axles extending beneath said side sill, rock arms pivotally secured to said axles and extending therefrom in the same direction, the free end portions of said rock arms extending upwardly, stub axles mounted in said upwardly extending portions and forming journals for said wheels, and a leaf spring rigidly secured to one of said rock arms and having a load sustaining connection with the free end of the other rock arm.

10. In a vehicle running gear, the combination with a frame and tandem wheels for supporting the same, of independently movable rock arms on said frame extending therefrom in the same direction and respectively connected to said wheels, a resilient arm rigidly secured to one of said rock arms and having a load sustaining connection with the other rock arm, whereby both static and dynamic loads are cushioned and proportionately distributed on said wheels, and brake mechanism for said wheels carried in part by said rock arms.

11. In a vehicle running gear, the combination with a frame, of tandem wheels overlapping the sides of said frame to permit the lowering thereof below the wheel centers, axles extending beneath and secured to said frame, rock arms connected respectively to said wheels extending in the same direction therefrom and pivotally mounted on said axles to be held thereby from substantial lateral deflection out of their planes of movement thereby limiting the clearance between said wheels and frame and increasing the width of loading capacity between wheels on the opposite sides of said frame, resilient arms rigidly secured to and extending oppositely from the rock arms on one of said axles and having load sustaining connections with the rock arms on the other axle, and brake mechanism for said wheels carried in part by said rock arms, whereby both static and dynamic loads are proportionately distributed on said wheels.

WILLIAM R. KALES.
IRVING H. JUDD.
PAUL HUEBSHMAN.
RUDOLPH H. HELMS.